United States Patent
Lim

(10) Patent No.: US 10,093,185 B2
(45) Date of Patent: Oct. 9, 2018

(54) SAFETY APPARATUS FOR BATTERY OF VEHICLE AND METHOD FOR OPERATING THE SAME

(71) Applicant: Hyundai Motor Company, Seoul (KR)

(72) Inventor: Hae Kyu Lim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/365,053

(22) Filed: Nov. 30, 2016

(65) Prior Publication Data

US 2017/0080803 A1    Mar. 23, 2017

Related U.S. Application Data

(62) Division of application No. 14/553,505, filed on Nov. 25, 2014, now Pat. No. 9,539,889.

(30) Foreign Application Priority Data

Aug. 13, 2014 (KR) ......................... 10-2014-0105315

(51) Int. Cl.
*B60R 16/04* (2006.01)
*B60L 3/00* (2006.01)
(Continued)

(52) U.S. Cl.
CPC ............. *B60L 3/0046* (2013.01); *B60K 1/04* (2013.01); *B60K 6/28* (2013.01); *B60L 3/0007* (2013.01); *B60L 3/04* (2013.01); *B60L 3/12* (2013.01); *B60L 11/1851* (2013.01); *B60L 11/1861* (2013.01); *B60L 11/1879* (2013.01); *H01M 2/347* (2013.01); *H01M 10/425*
(2013.01); *H01M 10/48* (2013.01); *B60L 2240/54* (2013.01); *B60Y 2200/91* (2013.01);
(Continued)

(58) Field of Classification Search
CPC .......... B60K 1/04; B60K 28/00; B60K 28/14; B60K 2028/006; B60L 3/0023; B60L 3/04; B60L 3/0092
See application file for complete search history.

(56) References Cited

U.S. PATENT DOCUMENTS 5,389,824 A * 2/1995 Moroto .................. B60K 28/14
                                              180/283
5,757,150 A * 5/1998 Kinoshita ............. B60L 3/0007
                                              200/61.08
(Continued)

FOREIGN PATENT DOCUMENTS

JP    H09263193 A    10/1997
JP    2001-060427 A    3/2001
(Continued)

*Primary Examiner* — James M Dolak
(74) *Attorney, Agent, or Firm* — Mintz Levin Cohn Ferris Glovsky and Popeo, P.C.; Peter F. Corless

(57) ABSTRACT

A safety apparatus for a vehicle battery and a method for operating the same capable of preventing accidents such as fire and battery explosion are provided. The safety apparatus includes a fixed housing that is fixed to a vehicle body and a movable housing that is movably disposed in the fixed housing to move due to external impact. An impact sensor is disposed within the fixed housing configured to be fractured due to the movement of the movable housing and an elastic member is configured to provide a restoring force to the movable housing.

2 Claims, 4 Drawing Sheets

(51) Int. Cl.
    *B60K 1/04*     (2006.01)
    *H01M 2/34*     (2006.01)
    *H01M 10/48*     (2006.01)
    *B60L 11/18*     (2006.01)
    *B60K 6/28*     (2007.10)
    *H01M 10/42*     (2006.01)
    *B60L 3/04*     (2006.01)
    *B60L 3/12*     (2006.01)

(52) U.S. Cl.
    CPC ....... *B60Y 2200/92* (2013.01); *B60Y 2300/26* (2013.01); *B60Y 2306/01* (2013.01); *H01M 2010/4271* (2013.01); *H01M 2200/00* (2013.01); *H01M 2200/20* (2013.01); *H01M 2220/20* (2013.01); *Y02T 10/7005* (2013.01); *Y02T 10/705* (2013.01); *Y10S 903/907* (2013.01); *Y10S 903/952* (2013.01)

(56) References Cited

U.S. PATENT DOCUMENTS

| | | | | |
|---|---|---|---|---|
| 7,011,176 | B2* | 3/2006 | Yugo | B60L 3/0015 180/274 |
| 7,422,293 | B2* | 9/2008 | Chorian | B60K 28/14 303/15 |
| 7,719,131 | B2* | 5/2010 | Evans | G01R 31/025 307/10.1 |
| 8,186,471 | B2* | 5/2012 | Ohno | B60L 3/0007 180/274 |
| 8,773,150 | B2* | 7/2014 | Hironaka | B60R 21/01 180/274 |
| 8,828,587 | B2* | 9/2014 | Deyda | H01H 39/006 429/158 |
| 8,900,733 | B2* | 12/2014 | Matsuura | H01M 2/1241 429/56 |
| 9,059,486 | B2* | 6/2015 | Mackintosh | H01M 10/425 |
| 9,472,800 | B2* | 10/2016 | Spjuth | B60R 16/02 |
| 9,490,467 | B2* | 11/2016 | Lim | B60L 3/0046 |
| 9,847,610 | B2* | 12/2017 | Basoukeas | H01R 13/717 |
| 9,873,331 | B2* | 1/2018 | Lachmund | B60L 3/0092 |
| 9,873,393 | B2* | 1/2018 | Nishijima | B60R 16/0238 |
| 9,889,742 | B2* | 2/2018 | Chen | B60L 3/0069 |
| 9,931,940 | B2* | 4/2018 | Parga-Cacheiro | B60L 3/04 |
| 9,945,910 | B2* | 4/2018 | Kiuchi | H02J 7/0021 |
| 9,948,086 | B2* | 4/2018 | Chatroux | H02H 3/087 |
| 2007/0152432 | A1* | 7/2007 | Uchida | B60K 28/14 280/735 |
| 2009/0096286 | A1* | 4/2009 | Buck | B60K 28/14 307/10.7 |

FOREIGN PATENT DOCUMENTS

| | | |
|---|---|---|
| JP | 2012-085416 A | 4/2012 |
| KR | 10-0164337 B1 | 9/1998 |
| KR | 20-0168057 Y1 | 2/2000 |
| KR | 2001-0036123 A | 5/2001 |
| KR | 10-2003-0052017 A | 6/2003 |
| KR | 2005-0007083 A | 1/2005 |
| KR | 2011-0009892 A | 1/2011 |
| KR | 10-2013-0051205 A | 5/2013 |
| KR | 2013-0051205 A | 5/2013 |
| WO | 2014-065484 A1 | 5/2014 |

* cited by examiner

SAFETY APPARATUS FOR BATTERY OF VEHICLE AND METHOD FOR OPERATING THE SAME

CROSS-REFERENCE TO RELATED APPLICATION(S)

This application is a divisional application of U.S. patent application Ser. No. 14/553,505, filed Nov. 25, 2014, which claims the benefit of priority to Korean Patent Application No. 10-2014-0105315, filed on Aug. 13, 2014. The entire content of each of the above-referenced patent applications is hereby incorporated by reference herein.

TECHNICAL FIELD

The present disclosure relates to a safety apparatus for a vehicle battery, and more particularly, to a safety apparatus for a vehicle battery and a method for operating the same, capable of reducing or preventing safety accidents of a vehicle battery such as fire or an explosion.

BACKGROUND

Recently, as the number of electric and electronic devices equipped within a vehicle, including hybrid vehicles increases, the use of a 42V battery instead of using the existing 12V battery has been developed. In operation, a hybrid vehicle uses an internal combustion engine and an electric motor at the same time. In general, the hybrid vehicle uses electricity to drive while the vehicle is started and also while driving at substantially low-speed. Once the vehicle accellerates or is driven at a substantially constant speed, a gasoline system is used. When the vehicle is driven at the increased speeds, the drive system uses electricity and the gasoline system together and then uses a method of automatically converting from using the gasoline system back to the electric motor at the time the vehicle stops. Due to the extensive use of the electric drive system a hybrid vehicle requires a large-capacity battery.

There are, however, inherent dangers associated with using a large-capacity battery in a vehicle. For example when an accident occurs (e.g., overturning the vehicle, or the like or when an external impact occurs), power is continuously supplied from the battery to the vehicle's electrical components and thus the risk of a short or a secondary fire may be increased.

Since an apparatus for controlling a vehicle battery according to the related art detects a vehicle collision with an electronic impact sensor, the reliability of determining whether to operate the apparatus for controlling a vehicle battery based on performance of the impact sensor and whether the impact sensor is operated may be reduced. Further, the related art for controlling a vehicle battery includes a complicated configuration and requires a substantial number of components, and therefore the cost thereof is substantial.

SUMMARY

An aspect of the present invention provides a safety apparatus for a vehicle battery and a method for operating the same, capable of sensing impact strength and likelihood of danger, using a mechanical signal to cut-off power to a battery pack. According to an exemplary embodiment of the present invention, a safety apparatus for a vehicle battery may include a fixed housing configured to be fixed to a vehicle body; a movable housing configured to be movably disposed within the fixed housing to move due to an external impact; an impact sensor disposed within the fixed housing and configured to be fractured due to a movement of the movable housing upon impact; and an elastic member configured to provide a restoring force to the movable housing after the external impact.

The safety apparatus for a vehicle battery may further include a fracture part configured to be extendedly formed in the movable housing toward the impact sensor to fracture the impact sensor by the movement of the movable housing. The impact sensor may include a notch which facilitates a fracture of the impact sensor. The impact sensor may include a conductive material and a connector electrically connected to a battery management system (BMS) of a battery pack of the vehicle.

According to another exemplary embodiment of the present invention there is a method for operating a safety apparatus for a vehicle battery in a vehicle involved in a collision. The safety apparatus may include a fixed housing configured to be fixed to a vehicle body; a movable housing configured to be movably provided in the fixed housing to move due to external impact; an impact sensor disposed within the fixed housing configured to be fractured due to a movement of the movable housing; and a battery management system of a battery pack. The method may include: determining, by a controller, whether a sensed voltage is 0V; and requesting, by the controller, a power relay assembly (PRA) of the vehicle to be turned off when the sensed voltage is about 0V. In the determination of whether the sensed voltage is about 0V, when the impact sensor is fractured, the sensed voltage may be about 0V. In the requesting by the controller, when the sensed voltage is 0V, a turning on of a vehicle controller warning lamp may be further requested.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
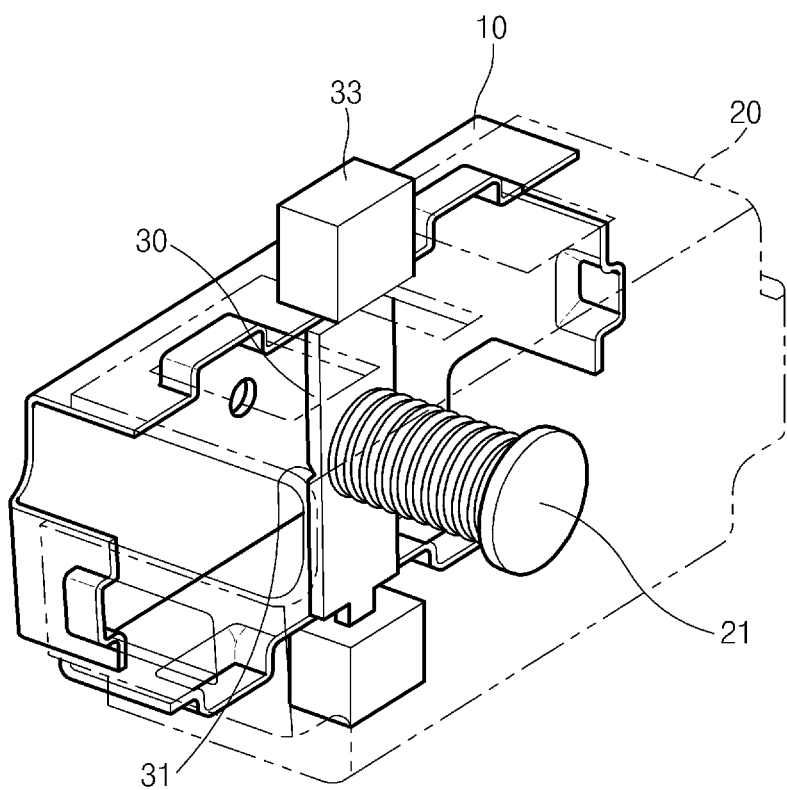
FIG. 1 is an exemplary view schematically illustrating a safety apparatus for a vehicle battery according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although the exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media 83 (see FIG. 4) on a computer readable medium containing executable program instructions executed by a processor 81 (see FIG. 4), controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. However, the present disclosure will not be limited or restricted to the exemplary embodiments below. Like reference numerals proposed in each drawing denote like components.

FIG. 1 is an exemplary view schematically illustrating a safety apparatus for a vehicle battery according to an exemplary embodiment of the present invention. As illustrated in FIG. 1, the safety apparatus for a vehicle battery may include a fixed housing 10 fixed to a vehicle body 1 (see FIG. 4), a movable housing 20 movably provided in the fixed housing 10 to move due to external impact, an impact sensor 30 disposed within the fixed housing 10 to be fractured due to the movement of the movable housing 20, and an elastic member 40 configured to provide a restoring force to the movable housing 20.

The fixed housing 10 may be fixed to the vehicle body. Specifically, the fixed housing 10 may be mounted adjacent to a mounting portion of the battery within the vehicle body 1, for example, mounted at a position at which the safety apparatus may first sense an impact (e.g., generated by an external collision) before the battery is damaged or broken due to the impact. In an exemplary embodiment, when the battery is mounted at a back of the vehicle, the fixed housing 10 may be mounted at the back of the vehicle in the vicinity of the battery so that the safety apparatus may prepare for a rear collision. For the same purpose, the fixed housing 10 may be preferably fixed to the vehicle body, at a the position at which the battery is mounted within the vehicle.

Figure 2:
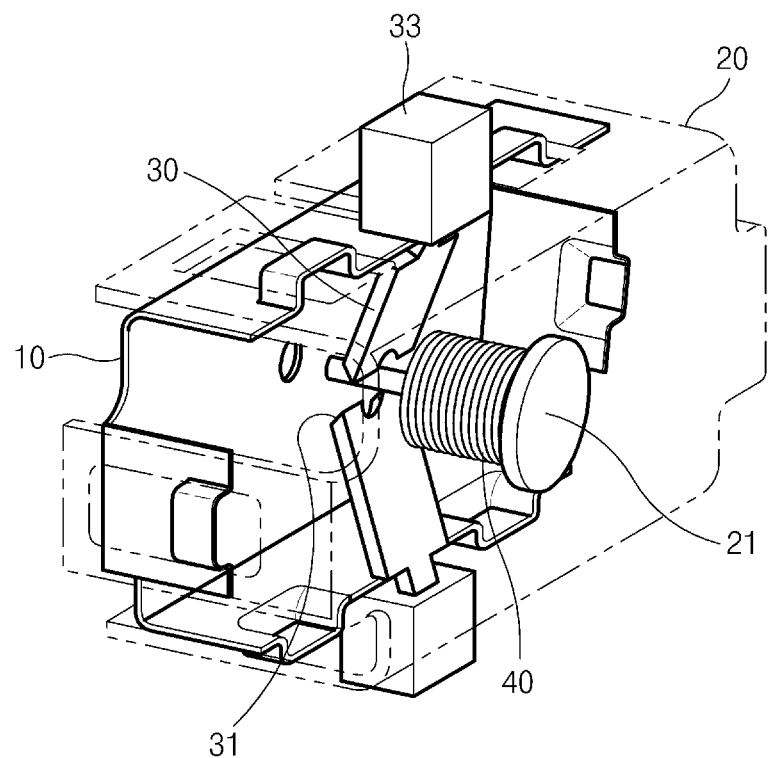
FIG. 2 is an exemplary use state diagram of a safety apparatus for a vehicle battery of FIG. 1 at the time of an impact.

FIG. 2 is an exemplary use state diagram of the safety apparatus of FIG. 1 during impact. Referring to FIG. 2, the movable housing 20 illustrated by a dotted line in FIG. 2 may be slidably mounted on the fixed housing 10 and thus may slidably move due to the impact generated by the external collision. In other words, the movable housing 20 may be disposed at a position at which the external collision may occur and thus slidably move to the fixed housing 10 from an opposite side of the fixed housing 10 due to the impact generated by the external collision. The impact sensor 30 may be disposed within the fixed housing 10 but may be disposed between the fixed housing 10 and the movable housing 20.

Figure 4:
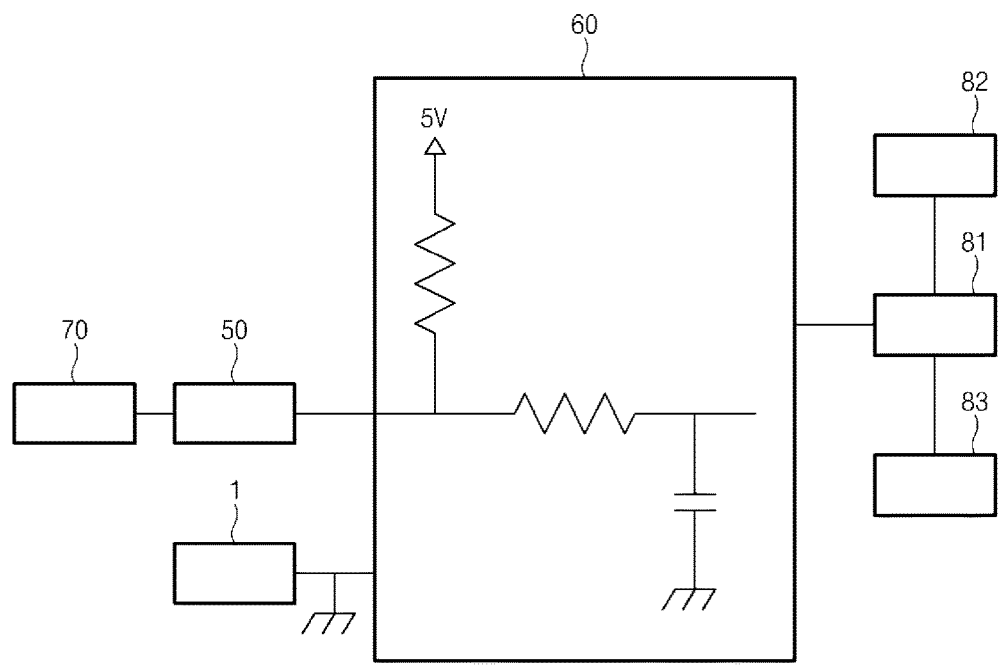
FIG. 4 is a schematic view illustrating a battery pack electrically connected to a Battery Management System (BMS).

Further, the impact sensor 30 may include a conductive material and one end or both ends thereof may include a connector 33 which may be electrically connected to a battery management system (BMS) 60 of a battery pack 50 of a vehicle (see FIG. 4). The impact sensor 30 may be operated electrically and powered by the vehicle battery and the battery management system 60 of a battery pack 50 may be configured to sense about 4.5 V to about 5.5 V across the impact sensor 30. Further, when the movable housing 20 moves due to the external collision, the impact sensor 30 may be mechanically fractured by the movable housing 20 and thus the battery management system 60 of the battery pack 50 may be configured to sense about 0V due the broken conductor creating an open circuit.

When the battery management system 60 of the battery pack 50 senses 0V, the battery management system 60 of the battery pack 50 may be configured to request a power relay assembly (PRA) 70 to be turned off to cut off power of the battery. In particular, the movable housing 20 may include a fracture part 21 which may extend to the impact sensor 30 and the impact sensor 30 may include a notch 31 which may facilitate a fracture of the impact sensor 30 by the movement of the movable housing 20, upon impact. Further, a position of the notch 31 in the impact sensor 30 may be positioned to correspond to a location of the fracture part 21.

The elastic member 40 may be disposed between the fixed housing 10 and the movable housing 20 to provide a restoring force to the movable housing 20 while reducing an excessive moving force of the movable housing 20 at the time the the movable housing 20 is displaced due to the external collision. The elastic member 40 may include any one of, but is not limited to a spring, a leaf spring, a fluid spring, a torsion spring, and a release spring. When the elastic member 40 includes a spring, the fracture part 21 may be inserted into a substantial center of the elastic member 40 to be supported by the fracture part 21. As described above, the safety apparatus for a vehicle battery may be mounted to the vehicle body 1 by welding, and the like.

Figure 3:
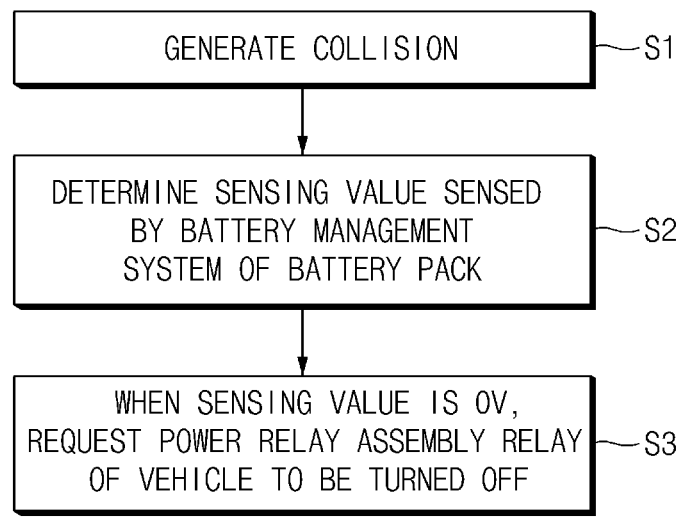
FIG. 3 is an exemplary flow chart illustrating a method for operating a safety apparatus for a vehicle battery according to an exemplary embodiment of the present invention.

A method for operating a safety apparatus for a vehicle battery according to an exemplary embodiment of the present invention will be described with reference to the accompanying drawings. FIG. 3 is an exemplary flow chart illustrating a method for operating a safety apparatus for a vehicle battery according to an exemplary embodiment of the present invention. The method for operating a safety apparatus for a vehicle battery may include sensing by an impact sensor, a vehicle collision from the exterior of the vehicle (S1).

Further, the method may include determining, by a processor, that the impact is a potential danger by sensing a voltage, is about 0V when the impact sensor 30 which is electrically connected to the battery management system 60 of the battery pack 50 is fractured; and determining, by the processor, that the impact is not a potential danger by sensing the sensed voltage, by the battery management system 60 of the battery pack 50, is about 4.5 V to about 5.5 V across the impact sensor 30 when the impact sensor 30 is not fractured (S2). Further, in the determination process (S2), when the voltage sensed by the processor is about 0V, the method may include requesting, by a controller, that the power relay assembly (PRA) 70 of the vehicle to be turned off (S3) to cut off the power of the battery, thereby preventing an accident, such as a fire or a battery explosion due to the potentially dangerous impact. In addition, in the requesting process (S3), when the voltage sensed by the processor 81 is about 0V, a controller may additionally be configured to request a warning lamp 82 of the vehicle be turned on.

As described above, according to exemplary embodiments of the present invention, the safety apparatus for a vehicle battery may be configured to cut off the high voltage power due to a collision to prevent the relay fusion and vehicular accidents such as a fire or a battery explosion, thereby improving safety in spite of the high current used in the electrical system of the vehicle. Other advantages include a simplified structure to reduce manufacturing costs over the related art which requires the separate collision (impact) and air bag sensor, and that the position of the safety apparatus may be adjusted according to a direction of likely collision risk, to correspond with the position of the battery pack for improved application compatibility.

Although the safety apparatus for a vehicle battery according to the exemplary embodiments of the present invention has been described with reference to the accompanying drawings, the present invention is not limited to the above-mentioned exemplary embodiments and drawings but may be variously modified and changed within the following claims by those skilled in the art to which the present invention pertains.

What is claimed is:

1. A method for operating a safety apparatus for a battery pack, the safety apparatus having a fixed housing fixed to a vehicle body, a movable housing movably disposed within the fixed housing in order to be able to move due to external impact, an impact sensor disposed within the fixed housing so as to be fractured due to a movement of the movable housing, an elastic member configured to provide a restoring force to the movable housing after the external impact, and a fracture part which is formed to extend within the movable housing toward the impact sensor to fracture the impact sensor by the movement of the movable housing, the method comprising:
    detecting, by a controller, an external collision;
    determining, by the controller, whether a sensed voltage, sensed by the controller, is 0V; and
    requesting, by the controller, a power relay assembly (PRA) to be turned off when the sensed voltage is 0V,
    wherein in determining whether the sensed voltage is 0V, when the impact sensor is fractured by the fracture part, the sensed voltage as determined by a battery management system of the battery pack is 0V.
2. The method according to claim 1, further comprising:
    requesting, by the controller, that a warning lamp be turned on in response to the sensed voltage being 0V.

* * * * *